United States Patent Office 3,356,691
Patented Dec. 5, 1967

3,356,691
PROCESS FOR PURIFICATION OF BENZOPHENONE TETRACARBOXYLIC DIANHYDRIDE
Richard F. Gaertner, Rexford, N.Y., assignor to General Electric Company, a corporation of New York
No Drawing. Filed Apr. 1, 1966, Ser. No. 539,263
5 Claims. (Cl. 260—346.3)

This invention relates to the purification of benzophenone tetracarboxylic dianhydride (BPDA), and more specifically to a process for producing BPDA of reliably standardized purity, which process is simple, inexpensive and productive of a high yield.

Crude BPDA such, for example, as is produced by the method described in U.S. Patent 3,078,279—McCracken et al., and sold commercially is so reactive with water that in the normal handling of this material it is very difficult to prevent contact with atmospheric moisture during shipment. The result of such contact with atmospheric moisture is the production of varying amounts of acidic components on the surface of the particles of BPDA. Tests have shown that the usual contaminant content as shipped (about 1.5% non-acidic components) may be increased unpredictably to at least as high as 5.0% impurities as calculated by the analytical method described hereinbelow. At some level of impurity content this crude BPDA becomes unsatisfactory for the preparation of polyimides [as, for example, by the process described in U.S. patent application S.N. 333,757, Holub, filed Dec. 26, 1963, now Patent No. 3,277,043, and assigned to the assignee of this invention]. Further, even though crude BPDA may have a low enough impurity content to produce a polyacidamide that can be cured to produced a suitable polyimide film, the solution viscosity (or molecular weight) of the polyacidamide can vary considerably depending on the particular impurity content of the crude BPDA, which value in turn varies considerably.

As is known, aromatic polyimides have particularly attractive electrical properties and have considerable utility as dielectric materials and as insulation for electrical devices. In high temperature insulation applications close control of the solution viscosity of the polyacidamide being applied to a substrate is often required to diminish the manufacturing variables. This is particularly true in the case of the application of a polymer coating to magnet wire from solution wherein close manufacturing controls are necessary to insure that the polymer coating meets acceptable standards of thickness, flexibility, heat-aging, cut-through temperature, heat shock and properly developed electrical properties. Thus, not only is it necessary to avoid the use of polyacidamide solutions of low intrinsic viscosities (below about 0.15) which result in brittle polyimide films, but it is also very important from a manufacturing point of view to have for the starting BPDA material, one which will provide a polyacidamide solution of predictable solution viscosity.

Thus, it is a prime object of this invention to provide a process for the treatment of crude BPDA which results in BPDA material of reproducible purity in the range of from 97.5% to 98.5% and may then be employed to produce a polyacidamide of reasonably predictable solution viscosity and intrinsic viscosity in the range of from about 0.2 to about 0.3 (as measured in cresol).

It is a further object of this invention in addition to the aforementioned object to provide a treatment process, which gives a high yield of acceptable BPDA.

The aforementioned and other objects are attained by a solvent-leaching process wherein the crude BPDA in the form of a powder is slurried at room temperature in a low boiling (boiling at a temperature of less than about 100° C. at atmospheric pressure) alcohol; separated therefrom and then dried.

It is well-known that alcohols react with dianhydrides to produce acid esters (Identification of Organic Compounds, Shriner and Fuson, 2nd edition, John Wiley & Sons Inc., p. 129; Qualitative Organic Analysis, Kamm, 2nd edition, John Wiley & Sons Inc., p. 55).

It would appear, therefore, that those of ordinary skill in the art realize that the formation of these acid esters of BPDA should be avoided, if possible, because any quantity of acid ester produced will be at the expense of still further diminished yield of purified BPDA and that to produce a polyimide from BPDA so increased in acid ester content would require a more expensive procedure. The most obvious manner of avoiding this acid ester formation, of course, is to avoid the use of alcohol as a leaching agent. However, upon closer examination and testing it was found that not only do alcohols react very slowly with BPDA at room temperature, but they very effectively take up and retain in solution such acid-ester formation as does occur, in addition to acidic components, as for example, benzophenone tetracarboxylic acid, color bodies and trace metals present in the crude BPDA. Thus, although the use of alcohols would ordinarily be rejected as volatile solvents for leaching BPDA, low boiling alcohols can be used, when properly handled, to effectively purify crude BPDA to a white, high yield product of predetermined purity of synthesize flexible high molecular weight aromatic polyimides.

Briefly, the method involves the steps of mixing low boiling alcohol with crude BPDA, which may have a purity ranging from about 97% to about 94%, stirring the mixture at room temperature (from about 20–30° C.) for about 20 minutes, filtering in an anhydrous nitrogen atmosphere, evaporating residual alcohol from the purified BPDA in a dry nitrogen-filled oven at 75° to 100° C. for about 15 hours and cooling and storing the purified BPDA in an anhydrous environment.

It is recognized that discrepancies can easily occur between reports of the purity of the same chemical depending upon the analytical method employed and the basic assumptions made. Therefore, all indications of product purity expressed herein have been determined using the same analytical method, which method is described below. It should be recognized that the indications of purity determined by this method may differ from the purities reported for crude BPDA at the point of manufacture partly because of the aforementioned reaction of the BPDA with atmospheric moisture en route from the manufacturer and partly because of the use of different analytical techniques.

According to the method employed to arrive at the product purities and solution viscosities reported herein five polyacid-amide solutions of 10% by weight solids are prepared under anhydrous conditions by reacting the BPDA with a diamine of known 100% purity in N-methylpyrrolidone solvent at room temperature. Each of the five solutions is prepared with a different stoichiometric molar ratio of dianhydride to diamine, calculated on the initial assumption that the BPDA has a purity of 100%. The range of stoichiometric molar ratio is chosen such that it includes the ratio of dianhydride to diamine producing a polyacidamide solution having the highest solution viscosity, based on an estimate of the actual purity of BPDA. These solution viscosities are then measured after the solutions have been permitted to stand at room temperature for 16 hours. The data from the viscosity measurements are subsequently plotted as a function of stoichiometric molar ratio of dianhydride to diamine with the composition of highest viscosity usually easily determinable by extrapolation, because some symmetrical cusp configuration will always result for the graphic plot.

Both the stoichiometric molar ratio of dianhydride to diamine at the composition of highest viscosity and the absolute value of the solution viscosity at this point are values indicative of the purity of the BPDA. If the purity of BPDA is 100%, the maximum viscosity will occur at a stoichiometeric molar ratio of unity, but if the purity is less than 100% the maximum will occur at ratios greater than unity. A maximum viscosity at a ratio of 1.03, for example, indicates that a molar excess of 3% BPDA must be used to react stoichiometrically.

Infrared and qualitative X-ray analysis were run on (a) the crude BPDA as received from the manufacturer, (b) the washed and dried BPDA after treatment and (c) the alcohol washings. The crude BPDA had a yellow color and contained about 3% acidic (—COOH) components, while the washed and dried BPDA was white and had only trace amounts of acidic components. An extract isolated from the alcohol washings from which the leached BPDA had been filtered, however, contained a small amount of acid groupings, a high concentration of ester groupings and greater than 5 parts per million of iron. In each instance polymer films prepared from the treated BPDA were clear and flexible. It appears, therefore, that alcohol leaching component did react with the crude BPDA, but very effectively removed not only the acid groupings, but also substantially removed all of the ester formation resulting from the alcohol-BPDA reaction, the color bodies and trace metal concentrations.

A number of anhydrous low boiling alcohols are useable for the conduct of this process as set forth in Table I (below), however, methanol, ethanol, isopropanol and mixtures thereof are the most economically feasible, with ethanol (or alcohol mixtures high in ethanol content) being preferred. An example of the latter is Shellacol (Commercial Solvents Corp.), which contains about 100 parts ethanol, 2 parts methanol, 1 part ethyl acetate, 1 part aviation gasoline and 5 parts water (probably present as an azeotrope with the ethanol).

*Table I.—(Pressure: 1 atmosphere)*

| Alcohol: | Boiling point, °C. |
| --- | --- |
| Methanol | 64.65 |
| Ethanol | 78.37 |
| Allyl alcohol | 96.88 |
| Propanol | 97.4 |
| Isopropanol | 82.5 |
| Sec-butanol | 99.5 |
| Tert-butanol | 82.9 |

In each of the examples listed in Table II to illustrate the yields of purified BPDA forthcoming using different alcohols the procedure followed was to (a) wash 100 grams of the crude BPDA in one liter of the alcohol for 20 minutes; (b) filter the slurry in a nitrogen-filled dry box; and (c) dry the filtered BPDA at 90° C. in a vacuum dessicator. By accurately weighing and measuring the ingredients and adhering to fixed time schedules and temperature controls the purity, as well as the yield, is reproducible irrespective of variations (2–4%) encountered in the purity of the crude BPDA.

*Table II*

| Alcohol: | Recovery (Percent of crude BPDA) |
| --- | --- |
| (1) Methanol | 53.8 |
| (2) Ethanol | 96.3 |
| (3) Isopropanol | 98.1 |
| (4) Shellacol | 93.8 |

As an indication of the considerable upgrading of the quality of the crude BPDA possible by the instant leaching process, polyacidamide solutions were prepared in N-methyl pyrrolidone solvent, which had been distilled and dried by passing through a molecular sieve. The BPDA in each case was reacted with methylene dianiline at room temperature in an anhydrous atmosphere and allowed to stand for 16 hours at room temperature before measuring viscosity. A 3 mole percent excess of methylene dianiline was used in the reactions and the solids concentration in the resulting polymer solution was 15%. The use of the 3 mole percent excess of diamine did not necessarily provide the optimum stoichiometry for each individual BPDA sample, but provided a convenient comparison of leached vs. non-leached BPDA as shown in Table III.

*Table III*

| Alcohol used in leaching process: | Solution viscosity of polyacidamide prepared from BPDA, 25° C. (centistokes) |
| --- | --- |
| (1) None (Crude BPDA) | 125 |
| (2) Methanol | 232 |
| (3) Ethanol | 189 |
| (4) Commercial denatured grade of ethanol (Shellacol) | 208 |
| (5) Isopropanol | 226 |

The following examples illustrate the nature of the polymer films resulting from various BPDA materials. As may be seen, clear flexible films result from the leached BPDA, while the particular crude BPDA had a sufficiently high impurity content that the polymer film produced therefrom could not be used.

EXAMPLE 1

To 834.6 grams of cresol was added 132.1 grams (0.41 mole) of crude BPDA (purity of about 94%). The resulting solution was heated to 130° C., at which point 44.3 grams (0.41 mole) of meta-phenylenediamine were added with stirring. Upon the addition of this latter material the solution temperature rose exothermally to 140° C. The temperature of the solution was then rapidly lowered to 40° C. by immersing the reaction vessel in a stirred ice bath. The resulting polymer had an intrinsic viscosity of 0.15 (as measured in cresol), and a film of the polymer produced by casting on a nickel substrate and curing for 3 minutes at 300° C., was opaque and brittle.

EXAMPLE 2

A solution was prepared by dissolving 1514.3 grams (4.70 moles) of refined BPDA in 2817.6 grams of cresol. The BPDA (purity of 98.3%) was purified from crude BPDA having a purity of 96.3% by the leaching technique of this invention using a commercial grade of ethanol (Shellacol). A second solution was also prepared by disolving 523.3 grams (4.84 moles) of meta-phenylenediamine in 3295.2 grams of cresol. These solutions were then heated to 146° C., after which they were mixed together for about 1.3 minutes. The temperature of this mixture was then rapidly (within about 5 minutes) lowered to 45° C., and within 15 minutes to room temperature. The resulting polymer solution was coated on glass and on copper substrates, and cured at temperatures between 200° C. and 350° C. for about ½ minute, to produce flexible adherent polyimide films in each case.

EXAMPLE 3

A solution of methylene dianiline was prepared by dissolving 4.247 grams of this material in 62.070 grams of N-methyl pyrrolidone that had been distilled and dried with molecular sieves. To 12.029 grams of this solution was added 1.216 grams of BPDA (purity of about 98%) that had been purified by leaching with anhydrous methanol. The reaction (BPDA and diamine) was carried out with stirring at room temperature under an anhydrous nitrogen atmosphere. The resulting solution, when cast on a glass substrate and cured at 250° C. for 3 minutes, produced a clear flexible film.

EXAMPLE 4

The procedure used in this example was identical to the one described in Example 3 except that 1.032 grams of the BPDA (purity of about 98%) was added to 10.207 grams of the methylene dianiline/N-methyl pyrrolidone solution. The BPDA had been purified by leaching with dry absolute ethanol. The resulting polymer solution, when cast on a glass substrate and cured at 250° C. for 3 minutes, produced a clear flexible film.

EXAMPLE 5

The procedure used in this example was also identical to the one described in Example 3 except that 1.034 grams of the BPDA (purity of about 98%) was added to 10.228 grams of the methylene dianiline/N-methyl pyrrolidone solution. The BPDA was purified by leaching with dry C.P. grade anhydrous isopropanol. A clear flexible film was produced after casting the polymer solution on a glass substrate and curing for 3 minutes at 250° C.

The reproducibility of the purity of the treated BPDA to an acceptable standard in spite of wide variations in the purity of the crude BPDA to be processed is illustrated in Table IV below:

TABLE IV

| Purity [1] (Percent BPDA) | Crude BPDA (Percent of batches) | Shellacol, Leached BPDA (Percent of batches) |
|---|---|---|
| 94.0–94.5 | 11.1 | |
| 94.5–95.0 | 0 | |
| 95.0–95.5 | 22.2 | |
| 95.5–96.0 | 0 | |
| 96.0–96.5 | 33.3 | |
| 96.5–97.0 | 11.1 | |
| 97.0–97.5 | 22.2 | |
| 97.5–98.0 | | 33.3 |
| 98.0–98.5 | | 66.7 |

[1] Analysis performed by synthesizing polyacidamide in N-methyl pyrrolidone, varying the excess BPDA and measuring the viscosity of the resulting solutions. Purity was indicated by excess BPDA required to produce highest viscosity solution.

As a result of this capacity to consistently standardize the purity of BPDA by the process of this invention, control over the production of polyimide films is made commercially feasible.

What I claim as new and desire to secure by Letters Patent of the United States is:

1. A method for converting crude BPDA to a standard purity in the range of from 97.5% to 98.5% and a white color for the production of a solution of polyacidamide of relatively uniform intrinsic viscosity comprising the steps of:

preparing a slurry of the crude BPDA in the form of a powder in an aliphatic hydrocarbon alcohol having a boiling point of less than about 100° C., stirring the slurry at room temperature, filtering the slurry to separate the BPDA from the alcohol containing dissolved impurities, and heating the BPDA in an inert atmosphere at a temperature in the range of from about 75°–100° C. to remove residual alcohol.

2. The method substantially as recited in claim 1 wherein the alcohol is selected from the group consisting of methanol, ethanol, isopropanol and mixtures thereof.

3. The method substantially as recited in claim 1 wherein the filtration step is conducted in an anhydrous environment.

4. The method substantially as recited in claim 1 wherein the alcohol is recovered by distillation.

5. The method substantially as recited in claim 1 wherein the purified dried BPDA is permitted to cool and is stored in an anhydrous environment.

References Cited

UNITED STATES PATENTS 3,078,279  2/1963  McCracken et al. ___ 260—346.3

ALTON D. ROLLINS, *Primary Examiner.*

B. DENTZ, *Assistant Examiner.*